(12) United States Patent
Itagaki et al.

(10) Patent No.: US 8,909,221 B2
(45) Date of Patent: Dec. 9, 2014

(54) POSITIONING APPARATUS AND POSITIONING METHOD

(75) Inventors: Kentaro Itagaki, Yokohama (JP); Jun Hashimoto, Yokohama (JP); Makoto Takahashi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 139 days.

(21) Appl. No.: 13/583,147

(22) PCT Filed: Apr. 18, 2011

(86) PCT No.: PCT/JP2011/059520
§ 371 (c)(1),
(2), (4) Date: Sep. 6, 2012

(87) PCT Pub. No.: WO2011/132635
PCT Pub. Date: Oct. 27, 2011

(65) Prior Publication Data
US 2013/0012229 A1    Jan. 10, 2013

(30) Foreign Application Priority Data

Apr. 20, 2010 (JP) ................. 2010-097259

(51) Int. Cl.
*H04W 4/00* (2009.01)
*H04W 64/00* (2009.01)
*G01S 11/06* (2006.01)
*G01S 5/14* (2006.01)

(52) U.S. Cl.
CPC ............. *H04W 64/00* (2013.01); *Y02B 60/50* (2013.01); *G01S 11/06* (2013.01); *G01S 5/14* (2013.01)
USPC ..................... 455/432.1; 370/328

(58) Field of Classification Search
CPC ....... H04W 8/183; H04W 48/18; H04W 8/12; H04W 80/04; H04W 88/06; H04W 88/08
USPC ..................... 455/432.1; 370/328
See application file for complete search history.

(56) References Cited

U.S. PATENT DOCUMENTS

2006/0193287 A1*   8/2006   Ooshima et al. .............. 370/328
2007/0115877 A1    5/2007   Zhen et al.
(Continued)

FOREIGN PATENT DOCUMENTS

JP    2003 264565    9/2003
JP    2009 543074    12/2009
(Continued)

OTHER PUBLICATIONS

International Search Report Issued Jul. 19, 2011 in PCT/JP11/059520 Filed Apr. 18, 2011.

(Continued)

*Primary Examiner* — William D Cumming
(74) *Attorney, Agent, or Firm* — Oblon, Spivak, McClelland, Maier & Neustadt, L.L.P.

(57) ABSTRACT

A positioning apparatus for performing a positioning operation based on distance to an access point includes an access point detection unit configured to detect an access point, a memory unit configured to store the access point detected by the access point detection unit for each of channels, a channel setup unit configured to set a channel to be scanned based on the access points in the memory unit, and a positioning operation unit configured to perform positioning based on the distance to the access point detected by the access point detection unit. The access point detection unit detects the access point based on the channel set by the channel setup unit.

4 Claims, 6 Drawing Sheets

(56) References Cited

U.S. PATENT DOCUMENTS

| | | |
|---|---|---|
| 2007/0202888 A1 | 8/2007 | Brachet et al. |
| 2008/0008117 A1 | 1/2008 | Alizadeh-Shabdiz |
| 2008/0008118 A1 | 1/2008 | Alizadeh-Shabdiz |
| 2008/0008119 A1 | 1/2008 | Alizadeh-Shabdiz |
| 2008/0008120 A1 | 1/2008 | Alizadeh-Shabdiz |
| 2008/0008121 A1 | 1/2008 | Alizadeh-Shabdiz |
| 2009/0286534 A1* | 11/2009 | Garg et al. ............. 455/432.1 |
| 2010/0303051 A1 | 12/2010 | Umeuchi et al. |

FOREIGN PATENT DOCUMENTS

| | | |
|---|---|---|
| WO | WO 2008/006077 A2 | 1/2008 |
| WO | 2009 104336 | 8/2009 |

OTHER PUBLICATIONS

Extended European Search Report issued on Feb. 14, 2014 in the corresponding European Application No. 11771970.8.

* cited by examiner

POSITIONING APPARATUS AND POSITIONING METHOD

TECHNICAL FIELD

The present invention relates to a positioning apparatus.

BACKGROUND ART

Combinations of position information and content information with various geographical information have been developed. The geographical information is utilized in various fields such as disaster prevention, security and traffic by using mobile communication techniques. The utilization of geographical information is called Location Based Services (LBSs). In the LBS, services and contents suitable for the position and environment of users are provided.

Infrastructure necessary to implement the LBS and main technical objects may include high-accuracy three-dimensional spatial data as well as a seamless positioning system, a communication system, a terminal and display technique and others that enable the position to be obtained in a wide range of space including indoors and outdoors.

As one example, the seamless positioning system includes wireless LAN based positioning.

Currently, services for positioning based on reception of radio waves transmitted from wireless LAN access points located in personal residences, business offices, cafes, train stations and so on are commonly available. Enormous numbers of wireless LAN access points are located in train stations and business areas. Wireless LAN based positioning services are extremely effective as positioning methods for train stations and business areas. Particularly, in using the Global Positioning System (GPS), the wireless LAN based positioning services are advantageous in an underground area where radio waves cannot be properly received from GPS satellites.

A positioning apparatus incorporated in a mobile communication terminal uses wireless LAN to perform positioning by detecting (finding) beacon signals transmitted from a neighboring access point and measuring the distance to the access point based on received strength of the beacon signals. See JP 2009-543074, for example.

DISCLOSURE OF INVENTION

Problem to be Solved by the Invention

In order to perform the wireless LAN based positioning, a positioning apparatus must find an access point. For example, the positioning apparatus may find an access point by searching for beacon signals transmitted from the access point. When the positioning apparatus searches for the beacon signals, the positioning apparatus has to scan a frequency band. It is preferred to scan the frequency band periodically. This is because the positioning apparatus performs the positioning while following migration of a mobile terminal apparatus accommodating the positioning apparatus.

Also, methods for scanning a frequency band to detect an access point include two types of methods, active scanning and passive scanning.

In the active scanning, a wireless LAN terminal transmits a probe request frame and waits for a probe response from an accessible access point. If the wireless LAN terminal receives the probe responses from multiple access points, the wireless LAN terminal selects an optimum access point based on respective radio conditions and transmits a reassociation request frame indicating a join request for joining in the wireless LAN to the selected access point.

In the passive scanning, a wireless LAN terminal has received beacon messages transmitted from an access point for a constant time period without transmitting a probe request frame. After reception of the beacon signals, the wireless LAN terminal transmits a reassociation request frame to the access point selected based on the beacon messages.

The passive scanning is commonly used in the wireless LAN based positioning. This is because identifiers of access points are required to be known in the active scanning. The identifier of an access point includes a Service Set Identifier (SSID).

In order to find an access point, the positioning apparatus must scan a whole frequency band where it is assumed that the access point may transmit beacon signals. In the wireless LAN, a frequency band of about 20 MHz in width may be used for radio communication between access points. The frequency of about 20 MHz in width is referred to as a channel. For example, "1ch" through "14ch" are available in IEEE 802.11b, and "1ch" through "13ch" are available in IEEE 802.11g. In order to detect an access point, the positioning apparatus must search all the channels. This is because the positioning apparatus cannot know a channel for the access point to transmit a beacon signal in advance. Since all channels available to the access point to transmit the beacon signal have to be searched, it takes a longer time to search the channels. In addition, the channels that are free from transmission of the beacon signal would be searched, which may lead to unnecessary power consumption.

The present invention addresses the above-stated problems, and one object of the present invention is to provide a positioning apparatus and a positioning method that can shorten time to search channels and reduce power consumed in the channel search in wireless LAN based positioning.

Means for Solving the Problem

A positioning apparatus according to one embodiment of the present invention relates to a positioning apparatus for performing a positioning operation based on distance to an access point, comprising: an access point detection unit configured to detect an access point; a memory unit configured to store the access point detected by the access point detection unit for each of channels; a channel setup unit configured to set a channel to be scanned based on the access points in the memory unit; and a positioning operation unit configured to perform positioning based on the distance to the access point detected by the access point detection unit, wherein the access point detection unit detects the access point based on the channel set by the channel setup unit.

A positioning method according to one embodiment of the present invention relates to a positioning method in a positioning apparatus for performing a positioning operation based on distance to an access point, comprising: detecting an access point; storing the detected access point for each of channels; setting a channel to be scanned based on the stored access points; and performing positioning based on the distance to the detected access point, wherein the detecting comprises detecting the access point based on the set channel.

Advantage of the Invention

According to the disclosed positioning apparatus and positioning method, in the channel search in wireless LAN based positioning, the channel search time can be shortened, and power consumed by searching the channel can be reduced.

EMBODIMENTS OF THE INVENTION

Embodiments of the present invention are described below with reference to the drawings. Throughout all the drawings, the same reference symbols are used for those having the same functions, and descriptions thereof are omitted.

[System]

A system is described to which a positioning apparatus 100 according to one embodiment is applied.

Figure 1:
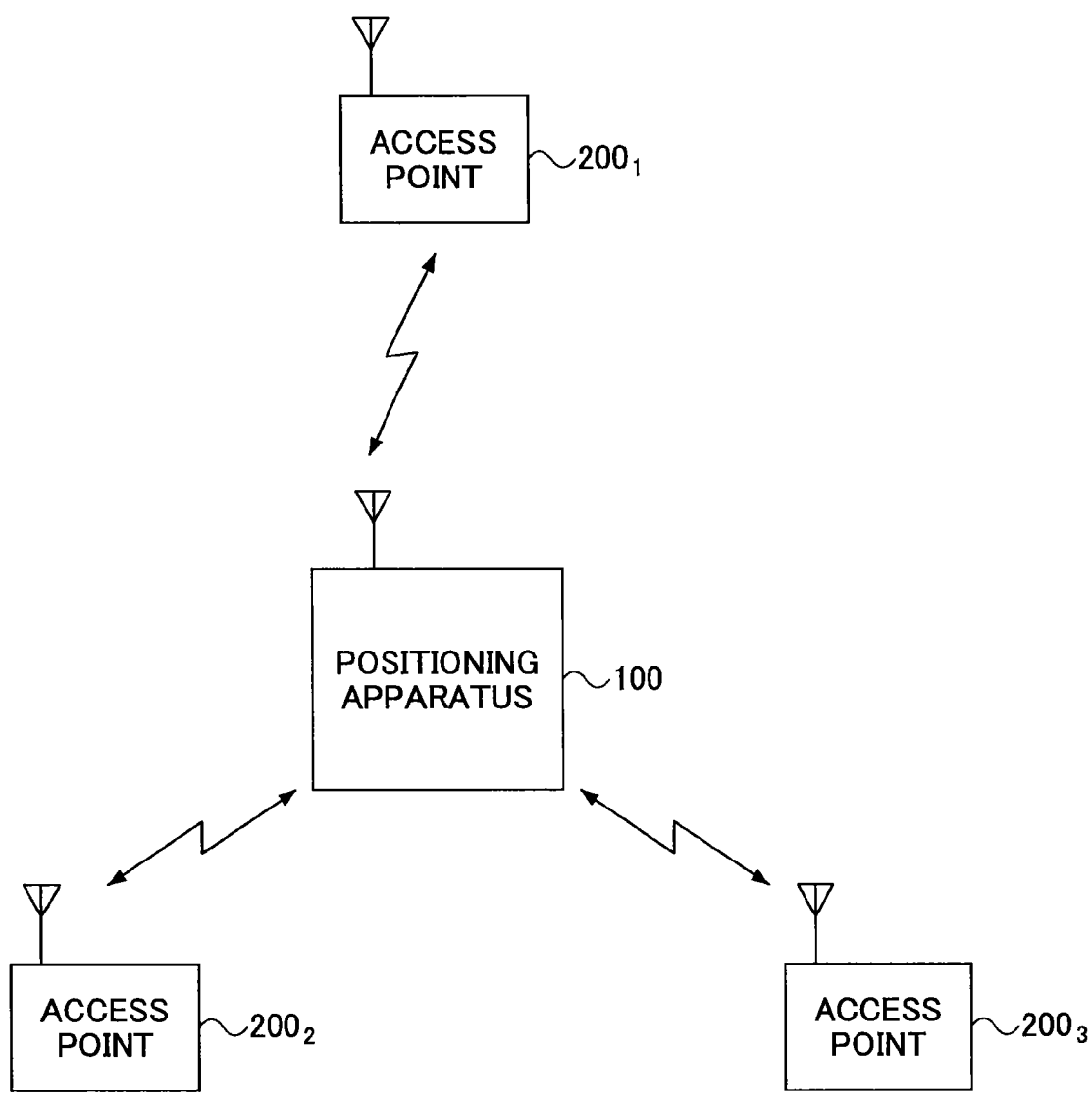
FIG. 1 is a schematic view for illustrating a system to which a positioning apparatus according to one embodiment is applied.

FIG. 1 illustrates the system to which the positioning apparatus 100 according to this embodiment is applied.

The system includes access points $200_n$ ("n" is a positive integer (n>0)). The access point may be referred to as a "base unit", a "base station", a "station" and so on. The positioning apparatus 100 performs positioning based on the distance to the detected access point $200_n$. In FIG. 1, one exemplary case of n=3 is illustrated. The parameter "n" may be smaller than or equal to 2 or greater than or equal to 4. For example, in cases of n=1, 2, an area where the positioning apparatus 100 is assumed to reside can be found based on the distance between the access point $200_n$ and the positioning apparatus 100. Also, as the parameter "n" is greater, the higher positioning accuracy is.

The positioning apparatus 100 may be accommodated in a mobile terminal apparatus, a Personal Digital Assistant (PDA) or a Personal Computer (PC).

The positioning apparatus 100 accommodated in a mobile terminal apparatus can obtain position information in an interior environment through positioning based on the distance to the detected access point $200_n$. Since the position information can be obtained in an interior environment, services can be provided based on the position information in the interior environment.

[Positioning Apparatus]

Figure 2:
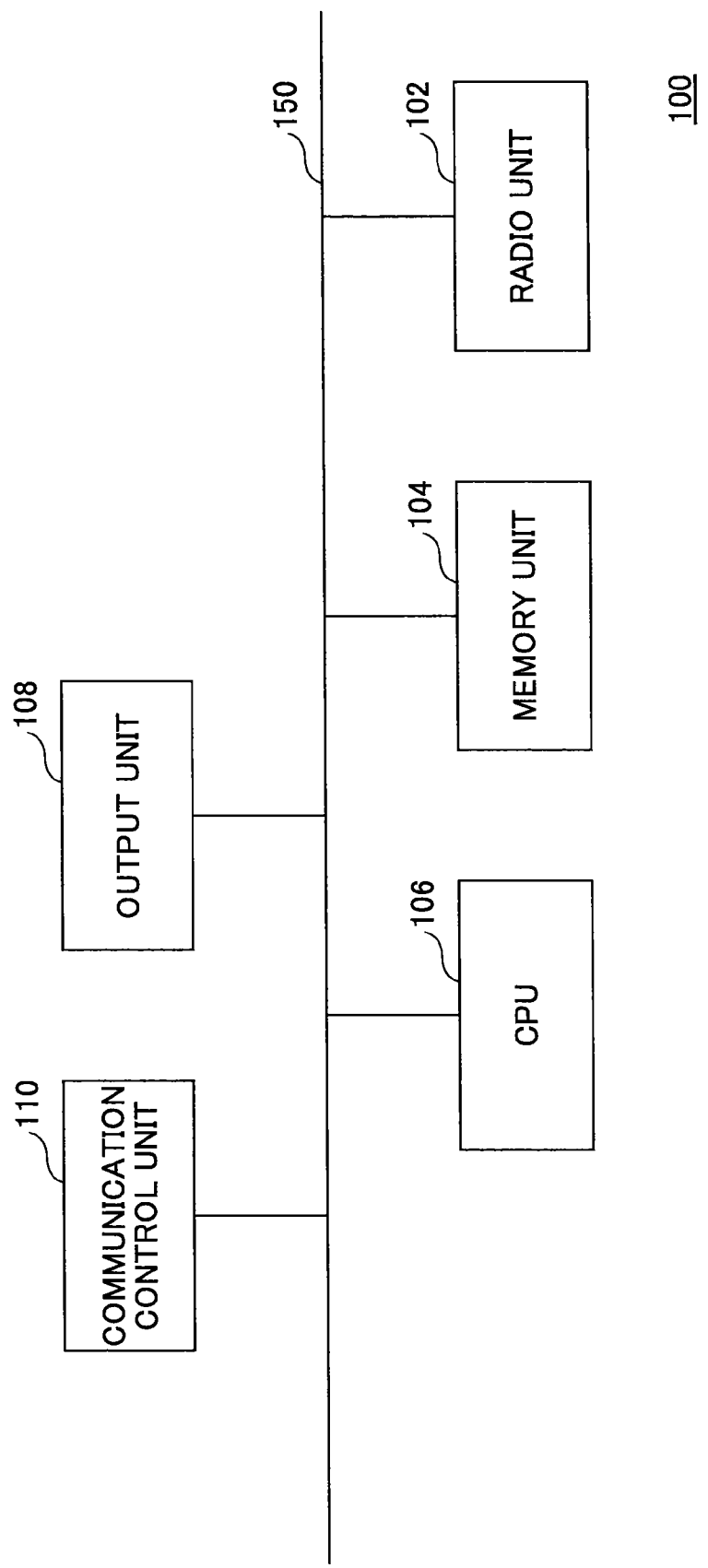
FIG. 2 is a block diagram for illustrating an exemplary hardware configuration of a positioning apparatus according to one embodiment.

FIG. 2 illustrates the positioning apparatus 100 according to the present embodiment. In FIG. 2, a hardware configuration is mainly illustrated.

The positioning apparatus 100 includes a radio unit 102, a memory unit 104, a Central Processing Unit (CPU) 106, an output unit 108 and a communication control unit 110. These functional blocks are coupled to each other via a bus 150.

The CPU 106 controls the radio unit 102, the memory unit 104, the output unit 108 and the communication control unit 110. The CPU 106 operates to execute predefined operations according to programs stored in the memory unit 104.

The radio unit 102 is controlled by the CPU 106 for radio communication with the access point $200_n$ in accordance with a predefined radio communication scheme. The radio communication scheme includes wireless LAN. Although IEEE 802.11 and IEEE 802.15 are available as wireless LAN standards, the radio communication scheme may comply with any other standard. The radio unit 102 converts information generated by the communication control unit 110 into a radio signal and then transmits the converted radio signal. Also, the radio unit 102 converts a radio signal transmitted from the access point $200_n$ into a baseband signal. The radio unit 102 measures receive strength of the radio signal transmitted from the access point $200_n$.

The memory unit 104 stores applications. The applications are software having functions of executing tasks on the positioning apparatus 100. Also, the memory unit 104 stores information regarding access points detected for each channel. Also, the memory unit 104 stores identifiers of access points $200_n$ that can be configured in the positioning apparatus 100. The identifier includes a Service Set ID (SSID) and an Extended SSID (ESSID). As long as the identifiers can identify the access points, the identifiers are not limited to the SSID and the ESSID.

The output unit 106 outputs position information calculated by the positioning apparatus 100. For example, the output unit 106 may provide the position information to an apparatus accommodating the positioning apparatus 100. If the apparatus is a mobile terminal apparatus, the mobile terminal apparatus can offer services based on the supplied position information.

For example, the services may include distribution of various information suitable for current position and time of a user.

Upon the positioning apparatus 100 detecting an access point and analyzing a signal received from the detected access point, the communication control unit 110 generates information to be transmitted. For example, the information generated upon detection of the access point includes a probe request in the active scanning. The probe request may include an identifier of the detected access point or information for requesting a response from an access point located near the positioning apparatus 100. Also, the signal transmitted upon detection of the access point may include a reassociation request in the active scanning and the passive scanning, for example.

For example, the signal received from the detected access point includes a probe response in the active scanning. The probe response may include an identifier of an access point transmitting the probe response. Also, the signal received from the detected access point may include a beacon in the passive scanning, for example. The beacon may include an identifier of the access point transmitting the beacon.

Also, when the active scanning is conducted, the communication control unit 110 controls the radio unit 102 so that the probe request can be transmitted for each channel. Also, when the passive scanning is conducted, the communication control unit 110 controls the radio unit 102 to scan a frequency band so that the beacon signal can be detected for each channel.

[Functions of Positioning Apparatus]

Operations running on the positioning apparatus 100 include an operation of scanning a frequency band to detect an access point $200_n$ (referred to as a "frequency band scanning operation" hereinafter). In the frequency band scanning operation, the frequency band is scanned or measured. The frequency band scanning operation includes an operation for searching channels. Also, the operations running on the positioning apparatus 100 include an operation for storing results of the frequency band scanning operation. The results include information regarding an access point detected for each channel. The detected access points may include an access point where a stealth function is enabled. Transmission of beacon signals from the stealth function enabled access point is aborted. Accordingly, the stealth function enabled access point may be an access point detected through the active scanning. Also, the detected access point includes an access point detected as a result of finding the identifier of the access point among the beacon signals.

The operations running on the positioning apparatus 100 include an operation for determining whether the frequency band scanning operation has been executed within a predefined time period until the current time. The operations running on the positioning apparatus 100 include an operation for determining whether there is a channel where no access point has been detected based on the frequency band scanning operation executed within a predefined time period until the current time. As a result of the determination, the channel where no access point has been detected is excluded from channels to be searched. It is preferred to use a result of the immediately previous frequency band scanning operation from the viewpoint that the determination should be made based on the frequency band scanning operation results closer to the current situation. Thus, in this embodiment, the case of the immediately previous frequency band scanning operation result being utilized is described.

The operations running on the positioning apparatus 100 include an operation for setting priority of channels to be searched based on the immediately executed frequency band scanning operation result. The operations running on the positioning apparatus 100 include an operation for setting a scan method based on the immediately executed frequency band scanning operation result. Also, the operations running on the positioning apparatus 100 include an operation for performing the frequency band scanning operation in the scan method determined in accordance with the priority of channels to be searched.

Also, the operations running on the positioning apparatus 100 include an operation for finding the distance to an access point detected based on a result of the frequency band scanning operation and determining the position of the positioning apparatus 100. For example, the distance to the access point $200_n$ may be found based on receive strength of a radio signal transmitted from the access point $200_n$. If the position of the access point $200_n$ is needed to find the distance, the position of the access point $200_n$ may be stored in the positioning apparatus 100 in advance or obtained in other methods. For example, a mobile terminal apparatus accommodating the positioning apparatus 100 may obtain the position of the access point $200_n$. For example, the mobile terminal apparatus may obtain the position information of the access point by accessing a server storing the position information. The mobile terminal apparatus may conduct radio communication in accordance with a predefined radio communication scheme. For example, the radio communication scheme may include Global System for Mobile Communications (GSM), Wideband Code Division Multiple Access (WCDMA) and Long Term Evolution (LTE).

Figure 3:
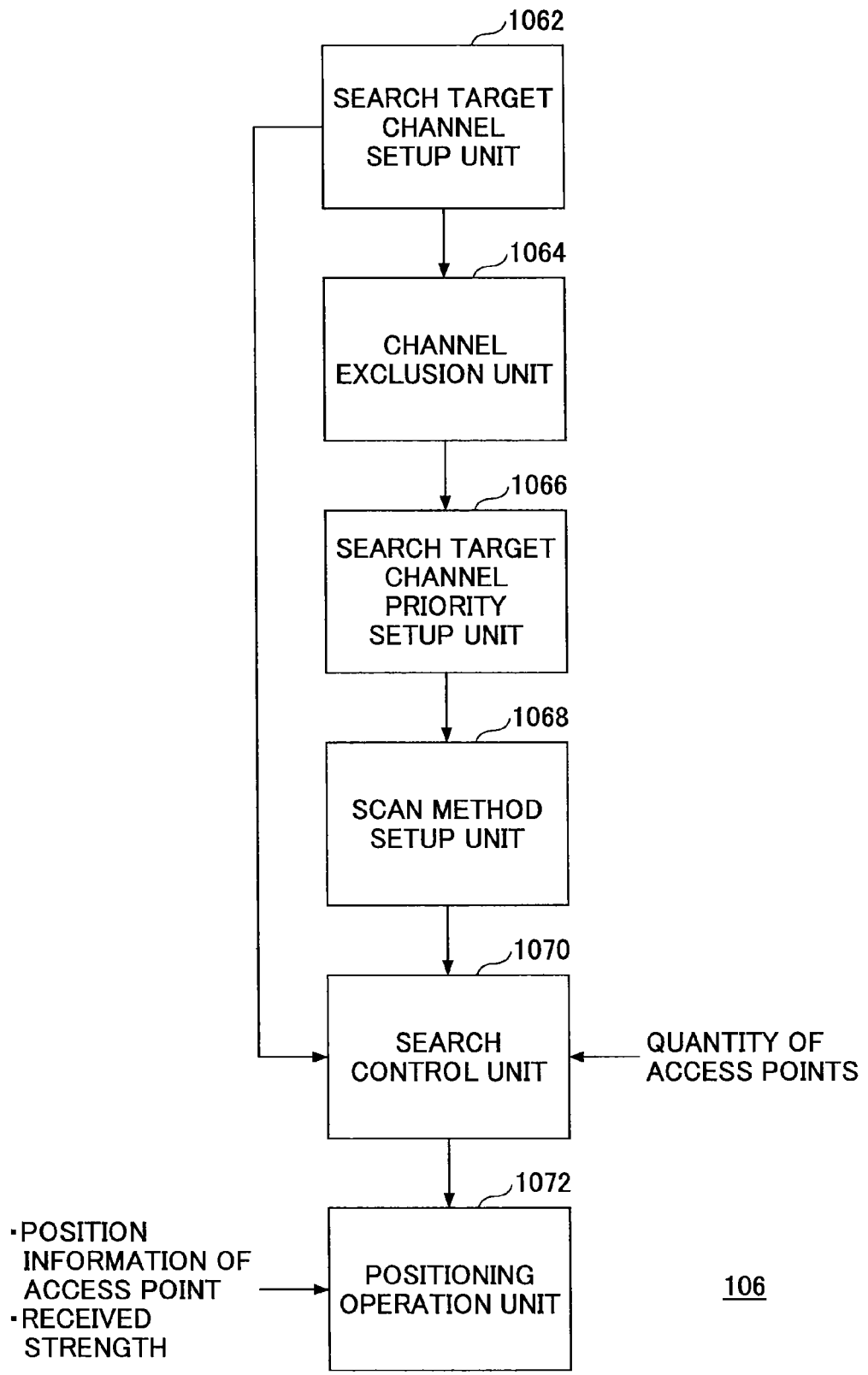
FIG. 3 is a functional block diagram for illustrating a positioning apparatus according to one embodiment.

FIG. 3 illustrates functions of the positioning apparatus 100.

The positioning apparatus 100 includes a search target channel setup unit 1062. The search target channel setup unit 1062 determines whether the frequency band scanning operation has been performed within a predefined time period until the current time. If the search target channel setup unit 1062 determines that the frequency band scanning operation has not been performed within the predefined time period, the search target channel setup unit 1062 sets all channels as search target channels. In other words, the search target channel setup unit 1062 sets the whole frequency band available for communication with the access point $200_n$ as the search target channels. This is because results of the previous frequency band scanning operations may be different from the result of the current frequency band scanning operation. If the search target channel setup unit 1062 determines that the frequency band scanning operation has not been performed within the predefined time period until the current time, the search target channel setup unit 1062 supplies information regarding all channels to be searched to a search control unit 1070. If the search target channel setup unit 1062 determines that the frequency band scanning operation has been performed within the predefined time period until the current time, the search target channel setup unit 1062 supplies results of the previous frequency band scanning operations to a channel exclusion unit 1064.

The positioning apparatus 100 includes the channel exclusion unit 1064. The channel exclusion unit 1064 is coupled to the search target channel setup unit 1062. The channel exclusion unit 1064 determines whether there is a channel where no access point has been found based on the immediately previous frequency band scanning operation result supplied from the search target channel setup unit 1062.

Figure 4:
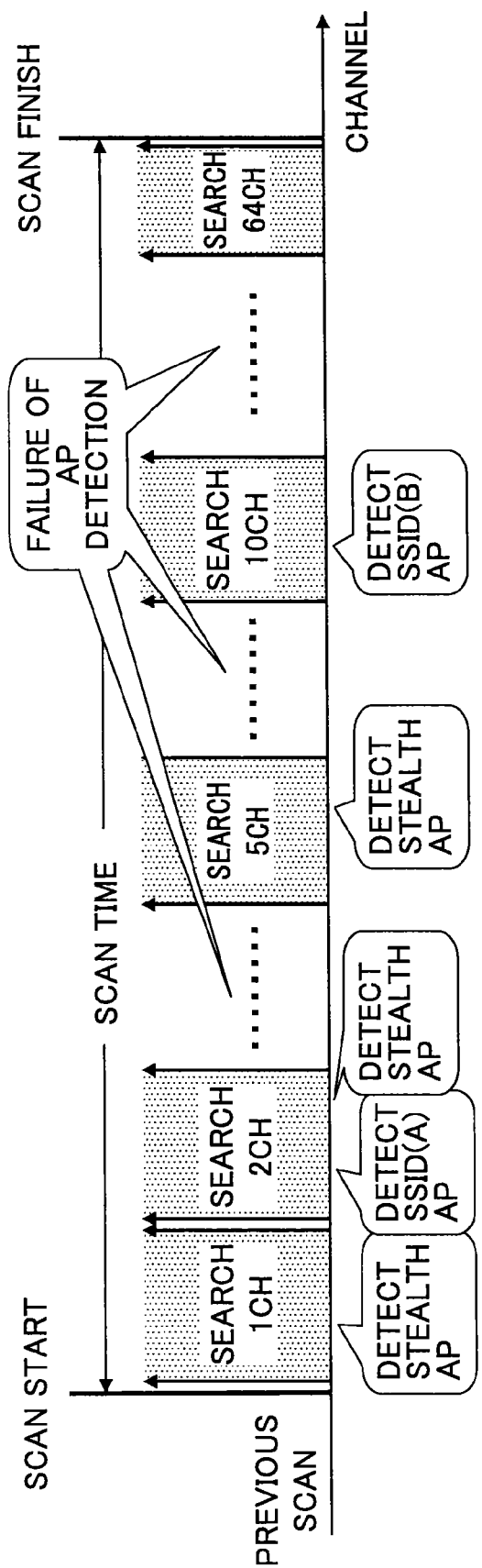
FIG. 4 is a schematic view for channel searches.

FIG. 4 is a diagram for illustrating results of the frequency band scanning operation.

In the example illustrated in FIG. 4, frequency bands "1ch" through "64ch" are scanned. However, the frequency bands "1ch" through "64ch" are illustrative, and frequency bands may be scanned for channels of more than "64ch". Also, frequencies of channels available to the positioning apparatus 100 may be scanned. This is because different channels are available for radio communication depending on different wireless LAN standards for use in the positioning apparatus 100.

In the example illustrated in FIG. 4, stealth function enabled access points are found in "1ch" and "5ch". In "2ch", a stealth function enabled access point and an access point having the SSID configured to "A" are found. In "10ch", an access point having the SSID configured to "B" is found. In channels other than "1ch", "2ch", "5ch" and "10ch", no access point is found.

In the example illustrated in FIG. 4, the channel exclusion unit 1064 excludes the channels where no access point has been found, that is, the channels other than "1ch", "2ch", "5ch" and "10ch", from the search target channels. The remaining channels are determined as the search target channels. In other words, the channels for the detected access points are determined as the search target channels.

The channel exclusion unit 1064 excludes the channels where no access point has been found from the search target channels supplied from the search target channel setup unit 1062 and supplies the remaining channels to a search target channel priority setup unit 1066.

The positioning apparatus 100 includes the search target channel priority setup unit 1066. The search target channel priority setup unit 1066 is coupled to the channel exclusion unit 1064. The search target channel priority setup unit 1066 determines for the search target channels supplied from the channel exclusion unit 1064 whether there is a channel where multiple access points have been found. The search target channel priority setup unit 1066 provides a higher priority to the channel where multiple access points have been found.

In the example illustrated in FIG. 4, a stealth function enabled access point and an access point having the SSID configured to "A" have been found in "2ch". The search target channel priority setup unit 1066 raises the search priority of the "2ch". If the search priority is increased for the channel where multiple access points have been found, the increasing amount of the priority may be adjusted depending on the number of the detected access points. For example, as the number of the detected access points is greater, the increasing amount of the search priority may be set to be greater. Also, the increasing amount of the priority may be adjusted depending on whether the detected access point corresponds to the stealth function enabled access point. The search target channel priority setup unit 1066 supplies information regarding the prioritized search target channels to a scan method setup unit 1068.

The positioning apparatus 100 includes the scan method setup unit 1068. The scan method setup unit 1068 sets or configures a scan method. The scan method includes active scanning and passive scanning.

As stated above, according to the active scanning, the positioning apparatus 100 transmits a probe request frame and then waits for a probe response transmitted from a connectable access point. If probe responses are received from multiple access points, the positioning apparatus 100 selects an optimum access point under respective radio conditions and sends the access point a reassociation request frame for requesting to join a wireless LAN.

According to the passive scanning, the positioning apparatus 100 receives beacon messages transmitted from an access point during a predefined time period without transmitting a probe request frame. After reception of the beacon messages, the positioning apparatus 100 transmits a reassociation request frame to the access point selected based on the beacon messages.

The scan method setup unit 1068 determines whether there is a channel where only an access point having an identifier of the access point set in the positioning apparatus 100 has been found in the prioritized search target channels supplied from the search target channel priority setup unit 1066.

In the example illustrated in FIG. 4, "10ch" corresponds to the channel where only an access point having the identifier of the access point set in the positioning apparatus 100 has been found. The scan method setup unit 1068 assigns the active scanning for the channel where only the access point having the identifier set in the positioning apparatus 100 has been found. Information regarding the channel assigned to the active scanning together with information regarding the prioritized channel to be scanned supplied from the search target channel priority setup unit 1066 is supplied to a search control unit 1070.

Furthermore, it is assumed that in addition to the channels searched as a result of setting the access points, an access point having its identifier known may be found through the immediately previous frequency band scanning operation. As to the access point having the known identifier detected through the immediately previous frequency band scanning operation, the active scanning may be set for a channel where only the access point having the known identifier has been found. Since the active scanning has a scanning rate faster than that of the passive scanning, the processing time can be shortened.

The positioning apparatus 100 includes the search control unit 1070. The search control unit 1070 is coupled to the scan method setup unit 1068 and the search target channel setup unit 1062. The number of access points for use in positioning operations is supplied to the search control unit 1070. The number of access points may be determined depending on applications executed by the mobile terminal apparatus accommodating the positioning apparatus 100. The search control unit 1070 controls channel search based on information regarding all channels supplied from the search target channel setup unit 1062 or information regarding the search target channels supplied from the scan method setup unit 1068 as well as information regarding the channels assigned to the active scanning.

For example, in the passive scanning, the search control unit 1070 detects an access point based on beacon signals received at the radio unit 102. Also, for example, in the active scanning, the search control unit 1070 causes the communication control unit 110 to generate a probe request frame and the radio unit 102 to transmit the probe request frame over the air. If a number of access points for use in the positioning operation have been found, the search control unit 1070 halts the channel search. The search control unit 1070 supplies the identifiers of the detected access points to a positioning operation unit 1072. Also, the search control unit 1070 instructs the radio unit 102 to provide the positioning operation unit 1072 with the received strength of radio signals transmitted from the detected access points. In response to the instruction from the search control unit 1070, the radio unit 102 provides the positioning operation unit 1072 with the received strength of radio signals transmitted from the detected access points. The search control unit 1070 stores the channel search results as results of the frequency band scanning operation in the memory unit 104. The channel search result includes time instant information regarding time of day when the search has been conducted. The channel search result includes information regarding access points detected for each channel. The access point information may include identifiers. Also, the access point information may include information regarding whether the stealth function is enabled for the access points.

The positioning apparatus 100 includes the positioning operation unit 1072. The positioning operation unit 1072 is coupled to the search control unit 1070. The position information of an access point and the receive strength of radio signals transmitted from the detected access point are supplied to the positioning operation unit 1072. For example, the position information of the access point may include correspondence between the identifier and the position of the access point. The positioning operation unit 1072 obtains the position information of the detected access point based on its identifier supplied from the search control unit 1070. The positioning operation unit 1072 finds the distance between the detected access point and the positioning apparatus 100 based on the position information and the received strength of radio signals transmitted from the detected access point. The positioning operation unit 1072 determines the position of the positioning apparatus 100 based on the distance.

In conjunction with FIG. 3, the order of the operations in the channel exclusion unit 1064, the search target channel priority setup unit 1066 and the scan method setup unit 1068 is not limited to the illustrated order and may be changed as needed.

[Operations of Mobile Terminal Apparatus]

Figure 5:
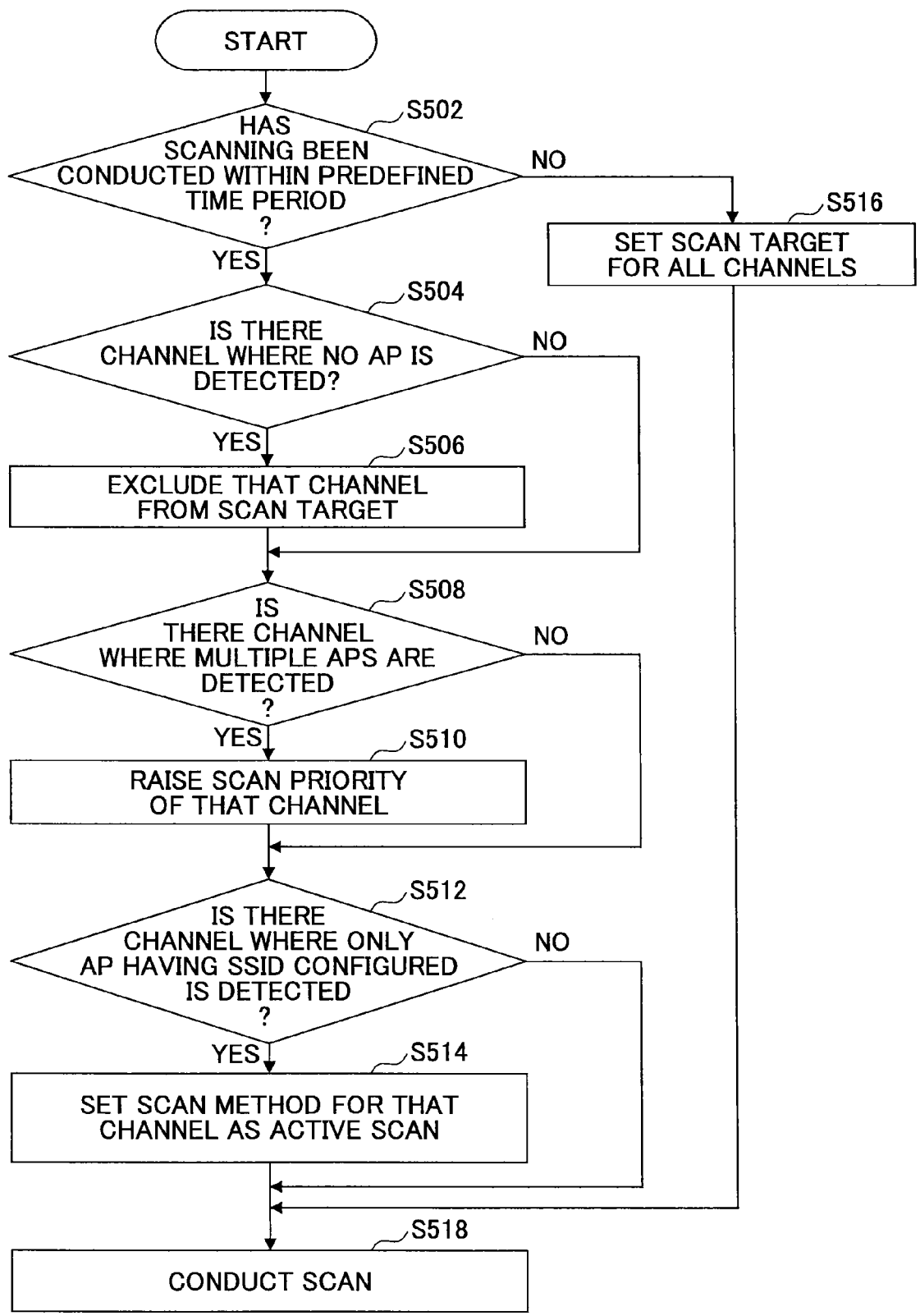
FIG. 5 is a flowchart for illustrating an operation of a positioning apparatus according to one embodiment.

FIG. 5 is a flowchart for illustrating an exemplary operation of the positioning apparatus 100. The number of access points for use in positioning operations is set in the positioning apparatus 100 in advance. The number of access points may be set by a user or depending on applications in the mobile terminal apparatus accommodating the positioning apparatus 100. A case where four access points are used in the positioning operation is described below. The four access points are simply illustrative, and the number of access points may be set to three, five or more.

The positioning apparatus 100 determines whether a scanning operation has been performed for a predefined time period (step S502). For example, the search target channel setup unit 1062 determines whether the frequency band scanning operation has been performed in the predefined time period based on the frequency band scanning operation results stored in the memory unit 104.

If it is determined that the frequency band scanning operation has been performed in the predefined time period (step S502:YES), the positioning apparatus 100 determines whether there is a channel where no access point has been found (step S504). For example, the channel exclusion unit 1064 determines whether there is a channel where no access point has been found based on the immediately previous (the latest) frequency band scanning operation result among the frequency band scanning operation results stored in the memory unit 104.

If it is determined that there is a channel where no access point has been found (step S504:YES), the positioning apparatus 100 excludes that channel from the search target channels (step S506). For example, if it is determined that there is a channel where no access point has been found, the channel exclusion unit 1064 excludes that channel from the search target channels.

On the ether hand, if it is determined that there is no channel where no access point has been found (step S504: NO), the positioning apparatus 100 does not exclude anything from the search target channels.

The positioning apparatus 100 determines whether there is a channel where multiple access points have been found (step S508). For example, the search target channel priority setup unit 1066 determines whether there is a channel where multiple access points have been found.

If it is determined that there is a channel where multiple access points have been found (S508:YES), the positioning apparatus 100 increases the priority of that channel in the frequency band scanning operation (step S510). For example, the search target channel priority setup unit 1066 increases the priority of the channel in the frequency band scanning operation.

On the other hand, if it is determined that there is no channel where multiple access points have been found (step S508:NO), the positioning apparatus 100 does not raise the priority in the frequency band scanning operation.

The positioning apparatus 100 determines whether there is a channel where only an access point having its identifier set in the positioning apparatus 100 has been found (step S512). For example, the scan method setup unit 1068 determines whether there is a channel where only an access point having its identifier set has been found.

If it is determined that there is a channel where only an access point having its identifier set has been found (step S512: YES), the positioning apparatus 100 selects the scan method for that channel as the active scanning (step S514). For example, if it is determined that there is a channel where only an access point having its identifier set has been found, the scan method setup unit 1068 selects the scan method for the channel as the active scanning. Channels other than the channel selected for the active scanning are selected for the passive scanning. Search time can be shortened by selecting the channel where only an access point having its identifier configured has been found for the active scanning.

On the other hand, if it is determined that there is no channel where only an access point having its identifier set has been found (step S512: NO), the positioning apparatus 100 determines that no channel is to be selected for the active scanning. For example, if it is determined that there is no channel where only an access point having its identifier set has been found, the scan method setup unit 1068 selects as the scan method for the channels the passive scanning.

The positioning apparatus 100 scans a frequency band (step S518). For example, if it is determined that the frequency band has not been scanned within a predefined time period (step S502: NO), the search control unit 1070 controls to scan frequency bands for all channels. Also, for example, the search control unit 1070 controls to scan frequency bands for remaining channels at step S506 in channels scanned in the previous frequency band scanning operation.

The operations of steps S502 through S514 are executed by the CPU 106 in the positioning apparatus 100 running operations in accordance with programs. The programs for causing the CPU 106 to act as the positioning apparatus 100 may be downloaded via a communication network, for example. Also, the programs may be provided in a recording medium such as a flexible disk, a CD-ROM and a memory card. In the case where the programs are provided in the recording medium, upon the recording medium being inserted in an auxiliary storage device on the positioning apparatus 100, the programs recorded in the recording medium are loaded. The CPU 106 writes the loaded programs in a RAM or a HDD and executes operations. The programs cause a computer (CPU 106) in the positioning apparatus 100 to execute steps S502 through S514 in FIG. 5. Also, the programs may cause the computer to execute at least a part of the steps, for example.

In FIG. 5, the operation order of steps S504-S506, S508-S510 and S512-S514 are not limited to the above-stated order, and may be changed as needed.

[Examples of Frequency Band Scanning Operation Results]

Figure 6:
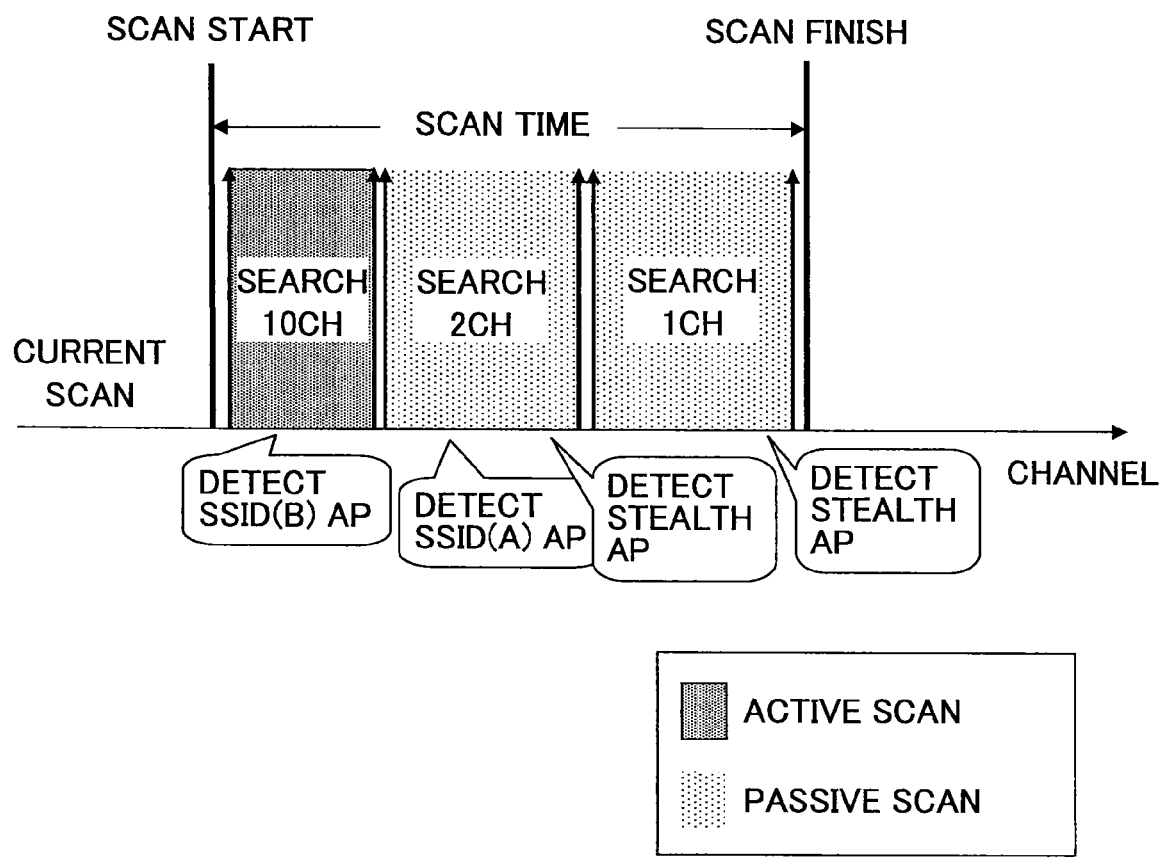
FIG. 6 is a schematic view for illustrating channel searches by a positioning apparatus according to one embodiment.

FIG. 6 illustrates exemplary frequency band scanning operation results.

In the example illustrated in FIG. 4, for example, "10ch" where only an access point having its identifier set in the positioning apparatus 100 has been found is first searched. This is because search time for the active scanning is shorter than that for the passive scanning. As a result of the search, an access point having the SSID configured as (B) has been found.

Second, "2ch" where multiple access points have been found in the frequency band scanning operation is searched. As a result of the search, an access point having the SSID configured as (A) and a stealth function enabled access point have been found.

Third, "1ch" where an access point has been found in the frequency band scanning operation is searched. As a result of the search, a stealth function enabled access point has been found.

Since the four access points have been found in this manner, the positioning apparatus 100 halts the channel search. The positioning apparatus 100 finds the distance between the positioning apparatus 100 and each of the four access points based on the respective positions of the access points and the receive strengths of radio signals transmitted from the access points. The positioning apparatus 100 determines the position of the positioning apparatus 100 based on the distances.

It may be changed as need which of a channel where only an access point having its identifier configured has been found and a channel where multiple access points have been found should be prioritized. The channel where multiple access points have been found may be prioritized.

In the above-stated embodiments, a channel to be searched may be selected depending on the migration distance from the position where the previous positioning was performed. Specifically, if it is determined that the migration distance from the position for the previous positioning is greater than or equal to a predefined threshold, it is determined that all channels should be searched. Otherwise, if it is determined that the migration distance from the position for the previous positioning is smaller than the predefined threshold, the channels to be searched may be determined based on the previous frequency band scanning operation result. If the migration distance from the position for the previous positioning is small, it is estimated that radio conditions may not change significantly. Thus, the previous frequency band scanning operation result can be utilized.

For example, a passometer may be utilized to estimate the migration distance from the position where the previous positioning was performed. Also, the estimation of the migration distance from the position for the previous positioning may be made based on whether a base station communicating with the mobile terminal apparatus accommodating the positioning apparatus 100 has been changed, for example, based on whether handover has been performed.

According to this positioning apparatus, a channel for which a higher likelihood of detecting an access point is estimated is first searched, which can shorten scanning (measurement) time of a frequency band. Due to shorter scanning time of the frequency band, the positioning time can be also shortened.

Also, since the channel for which a higher likelihood of detecting an access point is estimated is first searched, a smaller number of channels where no access point is found can be searched, which can reduce power consumption.

According to this embodiment, a positioning apparatus that performs a positioning operation based on the distance to the access point is provided.

The positioning apparatus includes an access point detection unit configured as a search control unit to detect an access point, a memory unit configured to store the access point detected by the access point detection unit for each channel, a channel setup unit configured as a search target channel setup unit to set a channel to be scanned based on the access point in the memory unit and a positioning operation unit configured to perform positioning based on the distance to the access point detected by the access point detection unit, wherein the access point detection unit detects the access point based on the channel set by the channel setup unit.

Since the channels to be searched are set based on a result of the previous frequency band scanning operation, the channels to be searched can be limited. Due to the limitation of the channels to be searched, scan (measurement) time of a frequency band can be shortened. Since the scan time of the frequency band can be shortened, positioning time can be also reduced.

Furthermore, the channel setup unit serving as the search target channel priority setup unit sets to scan a channel by priority based on the access points in the memory unit wherein a greater number of access points have been detected in the channel.

By scanning channels, where a greater number of access points have been detected, in prioritized order, the channels estimated to have a higher likelihood of detecting access points can be first searched, which can shorten scanning (measurement) time of a frequency band. Due to the shorter scanning time of the frequency band, positioning time can be also reduced.

Furthermore, the positioning apparatus includes a scan method setup unit configured, if the channels set by the channel setup unit include a channel for only an access point detected by the access point detection unit using an identifier of the access points set in the positioning apparatus, to detect the access point by using the identifier. The channel setup unit sets to scan by priority the channel set by the scan method setup unit to detect the access point by using the identifier, and the access point detection unit uses the identifier set by the scan method setup unit to detect the access point.

If a channel for only an access point detected by the access point detection unit using an identifier of the access points set in the positioning apparatus is included, the identifier is used to detect the access point, which can further shorten the search time.

Furthermore, the channel setup unit serving as the channel exclusion unit sets as the channels to be scanned the channel where an access point has been detected based on the access points in the memory unit.

The channels estimated to have a higher likelihood of detecting access points can be first searched, which can shorten scanning (measurement) time of a frequency band. Due to the shorter scanning time of the frequency band, positioning time can be also reduced.

According to the present embodiment, a positioning method in a positioning apparatus for performing a positioning operation based on distance to an access point is provided.

The positioning method includes an access point detection step of detecting an access point, a storage step of storing the detected access point for each channel, a channel setup step of setting a channel to be scanned based on the stored access point and a positioning operation step of performing positioning based on the distance to the detected access point, where the access point detection step comprises detecting the access point based on the set channel.

For convenience of explanation, specific numerals are used to facilitate understandings of the present invention. However, unless specifically stated otherwise, these specific numerals are illustratively used, and any other appropriate values may be used.

The present invention has been described with reference to specific embodiments, but the embodiments are illustrative, and variations, modifications, alterations and substitutions could be conceived by those skilled in the art. For convenience of explanation, apparatuses according to embodiments of the present invention have been described by means of functional block diagrams, but the apparatuses may be implemented in hardware, software or combinations thereof. The present invention is not limited to the above embodiment and various variations, modifications, alterations and substitutions can be included in the present invention without deviation from the spirit of the present invention.

This international patent application is based on Japanese Priority Application No. 2010-097259 filed on Apr. 20, 2010, the entire contents of which are hereby incorporated by reference.

LIST OF REFERENCE SYMBOLS

100: positioning apparatus
102: radio unit
104: memory unit
106: Central Processing Unit (CPU)
1062: search target channel setup unit
1064: channel exclusion unit
1066: search target channel priority setup unit
1068: scan method setup unit
1070: search control unit
1072: positioning operation unit
108: output unit
110: communication control unit
$200_n$ (n is a positive integer): access point

The invention claimed is:

1. A positioning apparatus configured to perform a positioning operation based on distances to one or more access points, comprising:

processing circuitry configured to detect the one or more access points during a first frequency band scanning operation of a plurality of channels; and a memory unit configured to store the detected one or more access points and the respective channels of the plurality of channels in which the one or more access points are detected during the first frequency band scanning operation;

wherein the processing circuitry is further configured to:

determine channel search target channels of the plurality of channels to be sequentially scanned during a second frequency band scanning operation that is after the first frequency band scanning operation based on the one or more access points and the respective channels stored in the memory unit, a sequence of the scanning of search target channels being determined based on a priority of each of the search target channels, wherein, when determining the search target channels sequence, a channel in which a plural number of access points are detected in the first frequency band scanning operation is given a greater priority than a channel in which a number less than the plural number of access points is detected during the first frequency band scanning operation, detect one or more access points based on the determined search target channels and the determined search target channels sequence during the second frequency band scanning operation, and perform positioning based on the distances to the one or more access points detected during the second frequency band scanning operation.

2. The positioning apparatus as claimed in claim 1, the processing circuitry further being configured to select, when a channel is detected with which only one or more access points having corresponding identifiers are found during the first frequency band scanning operation, an active scanning method as a scan method for the channel during the second frequency band scanning operation, determine to scan the channels during the second frequency band scanning operation such that the channel for which the active scanning method is selected is prioritized, and detect the one or more access points by using the active scanning method for the channel for which the active scanning method is selected.

3. The positioning apparatus as claimed in claim 1, wherein the search target channels are channels where an access point has been detected during the first frequency band scanning operation.

4. A positioning method implemented by a positioning apparatus, having processing circuitry, for performing a positioning operation based on distances to one or more access point, comprising:

detecting the one or more access points during a first frequency band scanning operation of a plurality of channels;

storing, in a memory unit, the detected one or more access points and the respective channels of the plurality of channels in which the one or more access points are detected during the first frequency band scanning operation;

determining search target channels of the plurality of channels to be sequentially scanned during a second frequency band scanning operation that is after the first frequency band scanning operation based on the one or more access points and the respective channels stored in the memory unit, a sequence of the scanning of search target channels being determined based on a priority of each of the search target channels, wherein, when determining the search target channels sequence, a channel in which a plural number of access points are detected in the first frequency band scanning operation is given a greater priority than a channel in which a number less than the plural number of access points is detected during the first frequency band scanning operation;

detecting one or more access points based on the determined search target channels and the determined search target channels sequence during the second frequency band scanning operation; and performing positioning based on the distances to the one or more access points detected during the second frequency band scanning operation.

* * * * *